United States Patent
Heinrich et al.

(10) Patent No.: US 11,402,882 B2
(45) Date of Patent: Aug. 2, 2022

(54) PULSE WIDTH MODULATION FAN

(71) Applicant: Hewlett Packard Enterprise Development LP, Houston, TX (US)

(72) Inventors: David F. Heinrich, Tomball, TX (US); Arthur Volkmann, Houston, TX (US); Rachel Pollock, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 309 days.

(21) Appl. No.: 16/135,307

(22) Filed: Sep. 19, 2018

(65) Prior Publication Data

US 2020/0089290 A1   Mar. 19, 2020

(51) Int. Cl.
*G06F 1/20* (2006.01)
*G05B 11/28* (2006.01)
*G05B 23/02* (2006.01)
*G06F 11/30* (2006.01)

(52) U.S. Cl.
CPC ............ *G06F 1/20* (2013.01); *G05B 11/28* (2013.01); *G05B 23/0218* (2013.01); *G06F 11/3058* (2013.01); *G06F 11/3003* (2013.01)

(58) Field of Classification Search
CPC ........ G06F 1/20; G06F 1/206; G06F 11/3058; G06F 11/3003; G05B 11/28; G05B 23/0218; G05B 19/414; H02P 2209/09; H02P 5/46; H02P 5/68; H02P 7/29; H02P 29/02; H02P 29/20; H02P 6/08; H02P 27/08; H02P 6/06; H04L 25/4902; H05K 7/20209; H05K 7/20836; F04D 27/001; F04D 27/004; Y10S 388/934; H03K 5/06; H03K 7/08; Y02B 30/70; G05D 23/1902; G05D 23/1917; Y02D 10/00; G08C 19/22
See application file for complete search history.

(56) References Cited

U.S. PATENT DOCUMENTS

| | | | |
|---|---|---|---|
| 6,545,438 B1 * | 4/2003 | Mays, II | H02P 6/08 318/400.01 |
| 6,563,284 B2 | 5/2003 | Teutsch et al. | |
| 6,931,306 B2 * | 8/2005 | Frankel | F04D 27/004 700/300 |
| 7,141,950 B1 | 11/2006 | Verge | |
| 7,199,542 B1 | 4/2007 | Chen | |
| 7,327,114 B2 | 2/2008 | Verge | |
| 7,612,508 B2 | 11/2009 | Jreij et al. | |
| 8,049,456 B2 | 11/2011 | Shahl et al. | |
| 9,057,378 B2 * | 6/2015 | Franz | G06F 1/20 |
| 10,467,892 B2 | 11/2019 | Jensen et al. | |

(Continued)

FOREIGN PATENT DOCUMENTS

| | | |
|---|---|---|
| JP | 2005080417 A | 3/2005 |
| KR | 20090095878 A | 9/2009 |

*Primary Examiner* — Yoshihisa Ishizuka
*Assistant Examiner* — Carter W Ferrell
(74) *Attorney, Agent, or Firm* — Brooks, Cameron & Haebsch, PLLC

(57) ABSTRACT

An apparatus can include a fan including a control pin. The fan may receive a pulse width modulated (PWM) signal at the control pin. The fan may further control a speed of the fan based on a duty cycle of the PWM signal when the PWM signal is in a first range and, responsive to the duty cycle of the PWM signal being in a second range, transmit information corresponding to the fan to an external controller.

20 Claims, 5 Drawing Sheets

(56) References Cited

U.S. PATENT DOCUMENTS

| | | |
|---|---|---|
| 2004/0001542 A1 | 1/2004 | Miller |
| 2007/0200518 A1* | 8/2007 | Verge ................. H05K 7/20209 318/268 |
| 2011/0320043 A1 | 12/2011 | Mikuszewski et al. |
| 2019/0390864 A1* | 12/2019 | Lambert ............... H02P 27/026 |

* cited by examiner

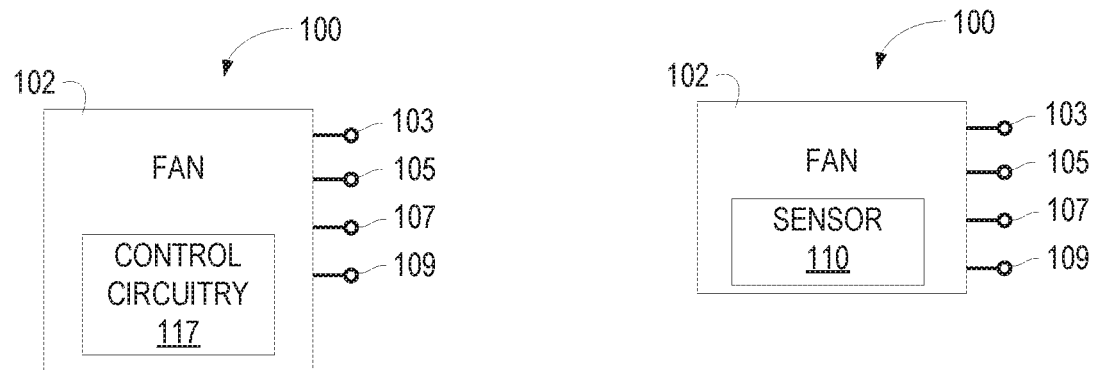
FIGURE 1A
FIGURE 1B
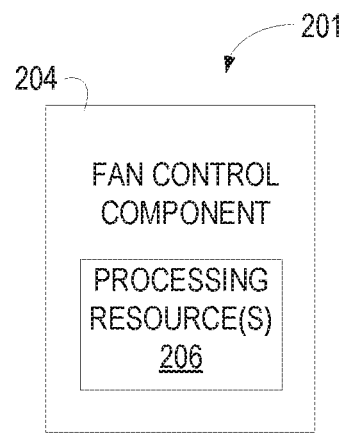
FIGURE 2
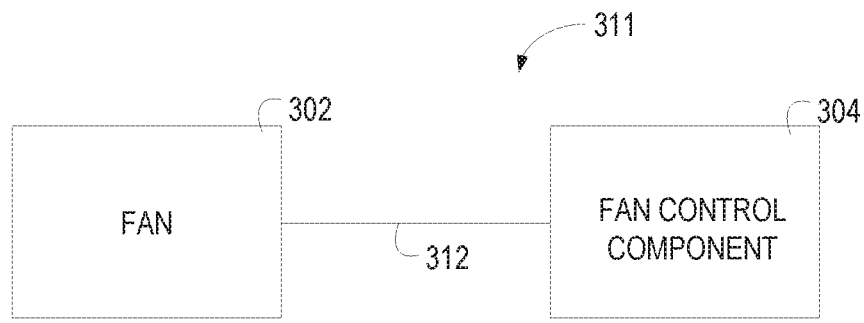
FIGURE 3

PULSE WIDTH MODULATION FAN

BACKGROUND

A fan can be utilized in a computing environment to create flow within a fluid, such as air. For example, a fan may be provided to the computing system to create flow across or along computing components in a computing environment to cool such computing components. A fan can operate based on signals received to pins coupled to the fan. At least one pin can provide a pulse width modulation signal to a pin of the fan to operate the fan or abort operation of the fan.

BRIEF DESCRIPTION OF THE DRAWINGS

FIG. 1A illustrates a block diagram in the form of an example apparatus including a fan consistent with the disclosure.

FIG. 1B illustrates a block diagram in the form of an example apparatus including a fan and a sensor consistent with the disclosure.

FIG. 2 illustrates a block diagram in the form of an example apparatus including a fan control component consistent with the disclosure.

FIG. 3 illustrates a block diagram in the form of an example system including a fan and a fan control component consistent with the disclosure.

DETAILED DESCRIPTION

Figure 4:
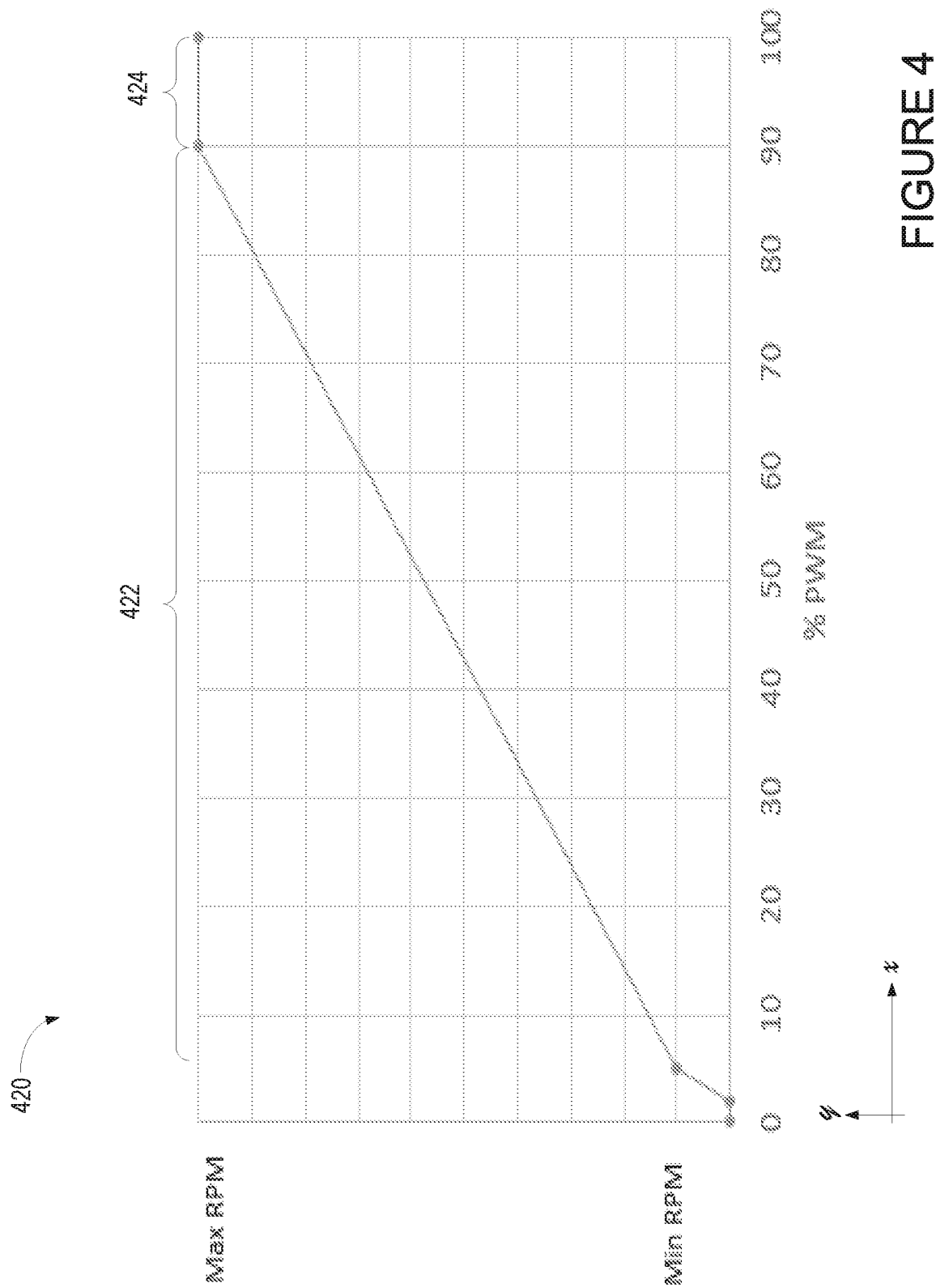
FIG. 4 illustrates a curve depicting an example of revolutions per minute versus pulse width modulation consistent with the disclosure.

One or more fans can be utilized in a computing system to provide fluid flow management to computing components in the computing system. Such fans can include a plurality of pins that can receive various signals in the course of operating the fan. The signals may be provided to the fan from an external controller such as a fan control component. In the course of operation, the fan or fans of the computing system may encounter issues such as degraded performance, failures, or other issues that can give rise to sub-optimal fan performance.

In order to remedy these and other issues, troubleshooting measures may be taken to determine a cause of the issues encountered by the fan or fans. Once the cause of the issue(s) is determined, the fan may be repaired, or the faulty fan may be removed, and a new fan may be installed. However, determining the cause of the issues can, in some approaches, include physical inspection of the fan(s) to determine information corresponding to the fan(s).

Physical inspection of the fan(s) can be undesirable, however, because in some approaches, physical inspection of the fan(s) can include a user or technician traveling to the location of the computing system in which the fan(s) is deployed. This can further include shutting down the computing system in which the fan(s) is deployed while the physical inspection takes place, which can incur system downtime and/or loss of computing resources to users of the computing system. These undesirable outcomes can incur costs in the form of technician compensation for time in physically inspecting the fans, as well as costs in the form of computing downtime, which can affect users of the computing system in a negative manner.

In contrast, examples described herein can provide apparatuses, methods, and/or machine-readable media that can allow for remote determination of information corresponding to the fan(s) in a computing system. For example, examples herein can allow for a communication sequence to be carried out between a fan and a fan control component in which information corresponding to the fan is transferred from the fan. The information can be used to track and/or analyze fan failures, among other things.

In some examples, the information corresponding to the fan can be utilized to predict fan errors or faults and/or may be used to determine pre-failure information for the fan. For example, if it becomes known that a particular lot of fans from a particular vendor are experiencing problems or issues, the information corresponding to the fan could be polled to take preemptive action to remedy potential faults in the fans before they actually occur. Such preemptive action could be taken, for example in response to a recall notice from the vendor, or could be based on knowledge that fans that were made at certain times or by certain vendors are more prone to certain faults or issues.

In some examples, as described herein, a specific duty cycle value or range of duty cycle values for a pulse width modulation (PWM) signal may be reserved for use in communicating an instruction to the fan to transfer information about the fan to an external location such as a fan control component. For example, the fan may be configured to interpret the duty cycle of the PWM signal exceeding a threshold value of the total PWM range that the fan is capable of receiving as such an instruction. Responsive to receipt of PWM signals whose duty cycle exceeds this threshold value (which may be a percentage of the total PWM range corresponding to the fan and/or a PWM value that corresponds to a particular revolutions per minute (RPM) value the fan(s) is to operate at), the fan may transfer information corresponding to the fan to an external location such as a fan control component. As used herein, a "PWM signal" refers to a pulse width modulated signal that is asserted on a pin of a fan to control a speed at which the fan operates in some instances and is asserted on a pin of a fan to initiate a transfer of data from the fan in other instances.

This can allow for information corresponding to the fan to be accessed remotely without the assistance of a technician, for example. Further, by utilizing existing pins of the fan to perform various aspects of the present disclosure, costly increases in connector size and/or redesign of the fan(s) to add additional pins or other communications channels may be avoided, for example. In addition, by selecting the threshold value at which a PWM signal can initiate the transfer of information corresponding to the fan(s), the chance that the fan will misinterpret the signal as a signal to perform a different operation can be minimized or eliminated. For example, by reserving a particular range of PWM signal values to initiate the transfer of information that is different from a range of PWM signal values that are utilized to operate the fan, it may be possible to ensure a dichotomy between operation of the fan and transfer of information from the fan.

Examples of the disclosure include apparatuses, machine-readable media, methods, and systems related to a pulse width modulation fan. In some examples, an apparatus can include a fan including a control pin. The fan may receive a pulse width modulated (PWM) signal at the control pin. The fan may further control a speed of the fan based on a duty cycle of the PWM signal when the PWM signal is in a first range and, responsive to the duty cycle of the PWM signal being in a second range, transmit information corresponding to the fan to an external controller.

FIG. 1A illustrates a block diagram in the form of an example apparatus 100 including a fan 102 consistent with the disclosure. The fan 102 can include a plurality of pins 103, 105, 107, and 109 to receive and/or transmit various signals in the course of operation. The fan 102 can include control circuitry 117 to control operation of the fan 102. The control circuitry can include logic, for example in the form of a field programmable gate array or application specific integrated circuit that can monitor the pins 103, 105, 107, and 109 of the fan 102 to determine characteristics of signals asserted to the pins 103, 105, 107, and/or 109 to control operation of the fan.

In some examples, a first pin 103 can be a PWM pin to receive PWM signals from an external source such as the fan control component 204 illustrated in FIG. 2, herein. As used herein, a "PWM pin" is a pin of the fan 102 that is configured to receive PWM signals asserted thereto from an external source. For example, a PWM pin (e.g., the first pin 103) can receive a pulse width modulated signal that is asserted on PWM pin of the fan 102 to control a speed at which the fan 102 operates in some instances and is asserted on a pin of the fan 102 to initiate a transfer of data from the fan 102 in other instances. In general, the fan 102 may control its speed based on the current duty cycle of PWM signal received at the first pin 103. However, a specific range of duty cycles (called the "second PWM range" or "second range of duty cycles of the PWM signal" below) may be reserved for requesting fan information rather than for controlling fan speed. For example, the first pin 103 can receive a signal in a first PWM range (e.g., a duty cycle of the PWM signal being in a first range) to cause the fan to operate in a normal mode of operation (e.g., a mode of operation in which the fan is on or off to provide fluid flow management to a computing component or computing system), and the first pin 103 can receive a signal in a second PWM range (e.g., a duty cycle of the PWM signal being in a second range) to initiate a data transfer operation using a different pin (e.g., the second pin 105). The first pin 103 can be referred to herein as a "control pin."

Figure 5:
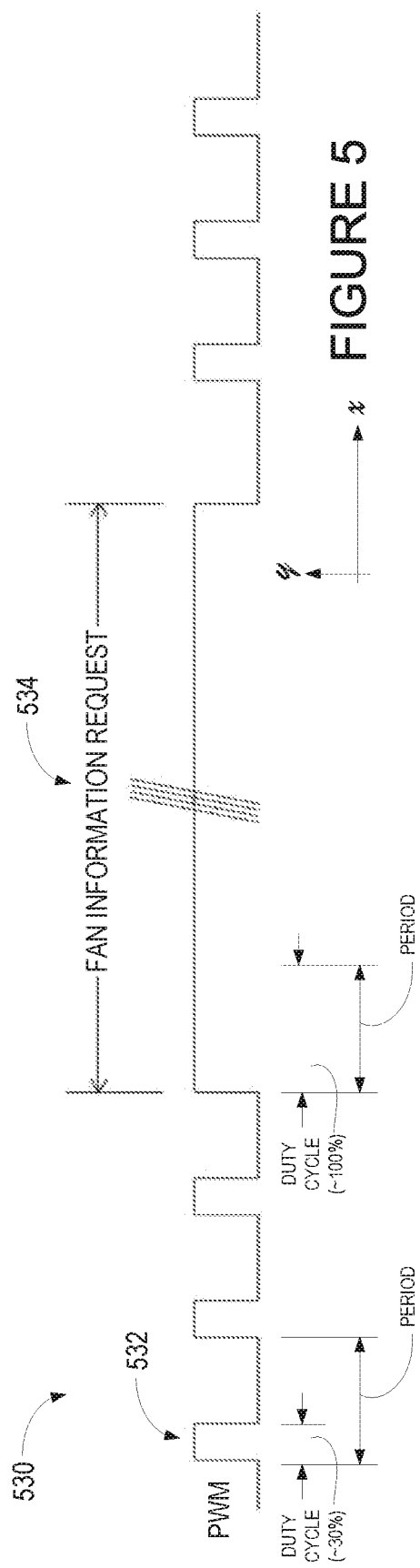
FIG. 5 illustrates an example timing diagram including an initiation signal consistent with the disclosure.

In general, PWM signals contain a train of pulses in repeating pulse periods, and convey information by controlling the durations (widths) of the pulses. The "duty cycle" of a given pulse is the proportion of the total pulse period during which the pulse is asserted. For example, FIG. 5 illustrates an example PWM signal 532 (or pulse 532) that has a duty cycle of around 30%, meaning that the pulse is asserted for around 30% of the period. Since the PWM signal is made up of these pulses, the PWM signal may also be referred to as having a duty cycle, which at any given moment is equal to the duty cycle of the most recently received pulse (or collection of pulses).

In some examples, the first PWM range and the second PWM range can correspond to different ranges of duty cycles. For example, the first PWM range can correspond to fan duty cycles of 90% or less, while the second PWM range can correspond to fan duty cycles between 90% and 100%, as described in more detail in connection with FIG. 4, herein. Examples are not so limited, however, and the first PWM range and the second PWM range can correspond to different ranges of fan duty cycles than those explicitly enumerated above.

The second pin 105 can be a fault signal pin, which can be used in some modes of operation to transmit a fault signal from the fan 102 and in other modes of operation to transmit information corresponding to the fan 102, as described in more detail, herein. For example, responsive to receipt, by the first pin 103, of a PWM signal within a first PWM range, the second pin 105 can either remain dormant (e.g., may not carry a signal to circuitry external to the fan), or may carry a fault signal from the fan 102 to external circuitry such as the fan control component 204 illustrated in FIG. 2, herein. In contrast, responsive to receipt, by the first pin 103, of a PWM signal within a second PWM range, the second pin 105 can carry information corresponding to the fan 102 to external circuitry.

The information corresponding to the fan 102 that may be carried by the second pin 105 in response to receipt of the PWM signal within the second PWM range by the first pin 103 can include, but is not limited to static data and/or telemetry data. As used herein, "static data" refers to data that could be provided as part of a manufacturer's data sheet and/or could be pre-programmed into the fan 102 prior to sale of the fan. Non-limiting examples of static data include an identification of the manufacturer or vendor, a revision number, a manufacturing date code, a barcode, a serial number, a nominal fan operation voltage, maximum current rating data for the fan, maximum RPM data for the fan, and/or other information that may be used to identify or otherwise characterize the fan 102.

As used herein, "telemetry data" refers to data that may be sensed or aggregated by the fan over time, such as environmental data and/or aggregated performance data. Non-limiting examples of telemetry data include fan bearing lifetime data, airflow data (e.g., cubic feet per minute data), pressure data, humidity data, temperature data, a number of faults experienced by the fan 102, how many hours the fan 102 has been in operation, an amount of power consumed by the fan over time and/or instantaneously, and/or other information that can be aggregated over time by the fan 102. In some examples, the telemetry data can be used to optimize performance of the fan 102. The telemetry data can be collected by a sensor associated with the fan, such as the sensor 110 illustrated in FIG. 1B, herein.

A third pin 107 can be a voltage pin to receive a power signal (e.g., +12 volts, +5 Volts, +3.3 Volts, etc.) to provide power to the fan 102. In some examples, a fourth pin 109 can be a ground pin to provide a ground reference potential to the fan 102.

As noted above, in some examples the fan 102 may have one or more sensors 110 associated therewith. Such an example is illustrated in FIG. 1B. The apparatus 100 illustrated in FIG. 1B may be the same as the apparatus 100 illustrated in FIG. 1A, except for the addition of the sensor(s) 110, and thus the same reference numbers are used herein to refer to their similar components. The components of the apparatus 100' that are the same as the components of the apparatus 100 will not be described again, to avoid duplicative description. The fan 102 and/or the sensor(s) 110 can be separately considered an "apparatus."

The sensor 110 can be a device and/or sub-system that can detect events or changes in its environment or environmental parameters (such as temperature, pressure, etc.) and store and/or transfer the information to another component. Specifically, the sensor(s) 110 may collect some or all of the telemetry data described above (or raw data from which the telemetry data may be deduced). The sensor(s) 110 may store data sensed thereby, send the sensed data to the control circuitry 117 to be stored, send the sensed data to an external controller, or some combination thereof. As discussed above, the telemetry data collected by the sensor 110 can include data that may be sensed or aggregated by the fan 102 over time, such as environmental data and/or aggregated performance data. In some examples, the sensor 110 can send information such as telemetry information collected thereby to a fan control component such as fan control component 204 illustrated in FIG. 2, herein.

FIG. 2 illustrates a block diagram in the form of an example apparatus 201 including a fan control component 204 consistent with the disclosure. The fan control component 204 may be a fan controller that is external to the fan 102 and that controls the fan 102 by providing power to and/or sending signals to the fan 102, for example via the pins 103, 107, and 109. The fan control component 204 may also receive information from the fan 102, for example, via the pin 105. For example, the fan control component 204 may be a fan controller and/or baseboard monument controller (BMC) of a computing device, such as a server.

The fan control component 204 may include control logic 206 that is configured to perform (or cause performance of) the operations described herein in relation of the fan control component 204, including transmission of signals to a fan to initiate transfer of information from the fan and receipt and/or processing of the information received in response to the transmitted signals. For example, the fan control component 204 can be configured to perform tasks and/or functions to control operation a fan (e.g., fan 102 illustrated in FIG. 1, herein), receive information corresponding to a fan, process the received information, analyze the received information, and/or cause the received information to be tabulated and/or displayed (e.g., by a graphical user interface), as described in more detail, herein. In some examples, the information corresponding to the fan 102 can be processed to determine statistical, analytical, or big data information corresponding to the fan 102.

The control logic 206 may include a processing resource and instructions executable thereby (e.g., computer code, firmware, software, machine code, etc.), or dedicated hardware/circuitry, or any combination thereof. A "processing resource" may include any circuitry that is capable of executing machine readable instructions, such as a processor, baseboard management controller (BMC), CPU, system-on-chip (SoC), digital signal processor, etc. "Dedicated hardware/circuitry" may include any hardware and/or circuitry that is configured to perform specific functions, such as an application specific integrated circuit (ASIC), field-programmable gate array (FPGA), complex programmable logic device (CPLD), etc.

In some examples, the fan control component 204 can be operable to transmit a pulse width modulated signal having a particular duty cycle to a particular signal pin of a fan, such as the fan 102 illustrated in FIG. 1, herein. The particular signal pin of the fan can be a PWM signal pin of the fan such as the first pin 103 illustrated in FIG. 1, herein. The PWM signal having the particular duty cycle can comprise a fan information request signal such as the fan information request signal 534 illustrated in FIG. 5, herein, which can operate as a request and/or instruction to the fan for information corresponding to the fan.

The particular (e.g., second) PWM range can correspond to an upper PWM range receivable by the fan. For example, the particular PWM range can correspond to an upper 10% of the total PWM signal range receivable by the fan, as discussed in more detail in connection with FIG. 4, herein. Examples are not so limited, however, and in some examples, the particular PWM range can correspond to a particular PWM digital encoding values such as 230-255 PWM. Further, in some examples, the particular PWM range can correspond to greater than (or less than) the upper 10% of the total PWM signal range receivable by the fan. For example, the particular PWM range can correspond to 5% of the upper range, 15% of the upper range, etc.

The fan control component 204 can be operable to receive information corresponding to the fan in response to transmission of the signal. For example, the fan control component 204 can be operable to receive information corresponding to the fan in response to transmission of the signal having a PWM range corresponding to the particular duty cycle to a particular signal pin of a fan. As described above, the information corresponding to the fan can include information regarding the fan's vendor, manufacture date, serial number, bar code, revision number, and/or other information that may be used to identify or otherwise characterize the fan.

The fan control component 204 can, in some examples, cause a diagnostic operation to be performed on the fan based on the information corresponding to the fan. For example, the fan control component 204 can process the information corresponding to the fan to analyze the fan's performance to track, analyze, troubleshoot, or otherwise tally and/or remedy faults or performance issues of the fan.

In some examples, the fan control component 204 can transmit a signal having a duty cycle that is in a particular range that corresponds to a duty cycle that is different than the particular duty cycle described above. For example, the fan control component 204 can transmit a signal that has a duty cycle that is within a lower PWM range than the particular PWM range. The lower PWM range can, in some examples, be a PWM range that is lower than 90% of the total PWM range receivable by the fan. In some examples, receipt of the signal that has the duty cycle within the lower PWM range than the particular PWM range can cause the fan to operate in a normal cooling mode of operation. In some examples, in the normal cooling mode of operation, the fan controls its speed based on the duty cycle of the PWM signal. Thus, the PWM signal may be considered to be a fan speed control signal when its duty cycle is outside the particular PWM range, and may be considered to be a request or instruction to transmit information about the fan when its duty cycle is inside the particular PWM range.

FIG. 3 illustrates a block diagram in the form of an example system 311 including the fan 302 and the fan control component 304. The fan 302 is an instance of the fan 102 illustrated and described in connection with FIG. 1, while the fan control component 304 is an instance of the fan control component 204 illustrated and described in connection with FIG. 2. In some examples, the fan 302 or the fan control component 304 can separately be considered an "apparatus."

The fan 302 and the fan control component 304 can be communicatively coupled via a communication link 312. The communication link 312 can be a physical communication link, such an interface, wire, or other physical communication path to provide communication between the fan 302 and the fan control component 304. Although shown as a single entity, the communication link 312 can comprise multiple communication links to, for example, facilitate transmission and receipt of signals to the pins 103, 105, 107, and 109 of the fan 102 illustrated in FIG. 1, herein.

Although shown as discrete components in FIG. 3, the fan 302 and the fan control component 304 need not be discrete and can, for example, be disposed or deployed on a single component such as an integrated circuit or contiguous printed circuit board.

FIG. 4 illustrates a curve 420 depicting an example of revolutions per minute (RPM) versus duty cycle of a PWM signal consistent with the disclosure. Specifically, the fan 102 may be configured to control its speed (i.e., RPM) based on the duty cycle of the PWM signal received at the first pin 103, and the curve in FIG. 4 illustrates one possible relationship between RPM and duty cycle that the fan 102 may be configured to use. As shown in FIG. 4, a range of RPMs for a fan (e.g., the fan 102 illustrated in FIG. 1) are shown on the y-axis of the curve 420, while the total range of possible duty cycles for the PWM signal that can be provided to the fan are is shown on the x-axis of the curve 420.

As shown in FIG. 4, in some examples, a first PWM range 422 corresponds to duty cycles between around 5% and 90% of a total PWM range receivable by the fan. A second PWM range 424 corresponds to PWM signals between around 90% and 100% of the total PWM range receivable by the fan. A Max RPM (e.g., a maximum RPM at which the fan can operate) corresponds to the highest duty cycle value of the first PWM range 422 (e.g. about 90%), but not the highest possible duty cycle value (e.g., 100%). This is in contrast to many other approaches, in which the MAX RPM corresponds to the highest possible duty cycle value. A Min RPM (e.g., a minimum RPM at which the fan can operate, which may be greater than zero RPM) corresponds to a lowest duty cycle value of the first PWM range 422 (e.g., about 5%), which is not necessarily the lowest possible duty cycle value (0%). Thus, various RPMs at which the fan can operate correspond to duty cycle values that fall within the first PWM range 422.

In some examples, the lowest PWM ranges shown in the curve (e.g., between 0% PWM and around 5% PWM) can correspond to a grace period during which a PWM signal is asserted to the fan, but the fan has not yet began operating. Some approaches have proposed utilizing this lowest range to initiate a transfer of information corresponding to the fan, however, such approaches could eliminate the grace period, which can lead to an increased chance that the fan misinterprets a fan information request signal. This can lead to inaccuracies or other problems in reliably initiating a transfer of information from the fan.

In some examples, the second PWM range 424 can correspond to the particular PWM range described in connection with FIGS. 1, 2, and 3, herein. For example, the second PWM range 424 can correspond to a duty cycle of a PWM signal being in a range that, when asserted to a PWM signal pin (e.g., pin 103 illustrated in FIG. 1, herein), can cause the fan to transmit information corresponding to the fan via a fault signal pin (e.g., pin 105 illustrated in FIG. 1, herein).

By reserving the second PWM range 424 for initiation of an operation to transfer information corresponding to the fan, it may be possible to reduce or eliminate a chance that the fan either continues normal operation instead of initiating the transfer of information, or it may be possible to reduce or eliminate transmission of a fault (e.g., an error) signal being transmitted from the fan.

FIG. 5 illustrates an example timing diagram 530 including a fan information request signal 534 consistent with the disclosure. As shown in FIG. 5, a PWM signal having a first duty cycle 532 is being applied to a fan (e.g., fan 102 illustrated in FIG. 1, herein). In the example of FIG. 5, the first duty cycle of the PWM signal 532 is about 30%, but this is just one example. In some examples, the signal is asserted to a PWM pin of the fan such as the first pin 103 illustrated in FIG. 1, herein. The duty cycle of the PWM signal 532 falls within a first PWM range (e.g., the first PWM range 422 illustrated in FIG. 4, herein) and therefore in response to receipt of the PWM signal 532, the fan may operate in a normal mode of operation. Stated alternatively, in response to receipt of the PWM signal 532, the fan may operate to provide fluid flow to a computing component and/or a computing system. For example, the fan may operate at a speed that is based on the duty cycle of the PWM signal 532.

At some point in time, a fan information request signal 534 can be asserted to the PWM pin of the fan. The fan information request signal 534 can have a different duty cycle than the first duty cycle 532 of the PWN signal 532—specifically, the duty cycle of the fan information request signal 534 falls within a second PWM range (e.g., the second PWM range 424). In the example, of FIG. 5, the duty cycle of the fan information request signal 534 is shown as a 100% duty cycle, but this is merely one example. In some examples, the PWM signal 532 that has the first duty cycle and/or the PWM signal that corresponds to the fan information request signal 534 can be asserted by a fan control component such as the fan control component 204 illustrated in FIG. 2, herein.

As noted above, the fan information request signal 534 is a PWM signal whose duty cycle falls within a second PWM range (e.g., the second PWM range 424 illustrated in FIG. 4, herein), and therefore, the fan information request signal 534 may cause the fan to initiate a transfer of information corresponding to the fan as described in connection with FIGS. 1-3, herein. The fan information request signal 534 may be asserted for a threshold period of time, which may span multiple PWM pulse periods. In a non-limiting example, the fan information request signal 534 may be asserted for around 500 milliseconds (ms). Asserting the fan information request signal 534 for multiple PWM periods may assist in distinguishing between signals that cause the fan to operate in the normal mode of operation and signals that cause the fan to transfer information corresponding thereto. In FIG. 5, because the fan information request signal 534 has a duty cycle of 100% and is asserted for multiple periods, it appears as one pulse spanning those multiple periods. However, in examples in which the fan information request signal 534 has a duty cycle less than 100% and spans multiple PWM periods, it may appear as a string of multiple pulses.

In some examples, during assertion of the fan information request signal 534, the fan may continue to operate in the normal mode of operation so as to continue to provide fluid flow to the computing components and/or computing system in which the fan is deployed. For example, the fan may continue to operate at a same speed prior to, during, and/or after assertion of the fan information request signal 534. For example, the fan may remember the duty cycle of the PWM signal that was received immediately prior to the fan information request signal 534, and may control its speed based on that duty cycle until a new PWM signal having a duty cycle in the first range is received. In addition to, or in the alternative, the fan can lock its operation at a current RPM as soon as it recognizes the fan information request signal 534 (e.g., prior to initiation of the data transfer). This can allow for the fan to continue operating normally during the data transfer operation(s) as opposed to operating with varying speed, which may result in sub-optimal performance.

Figure 6:
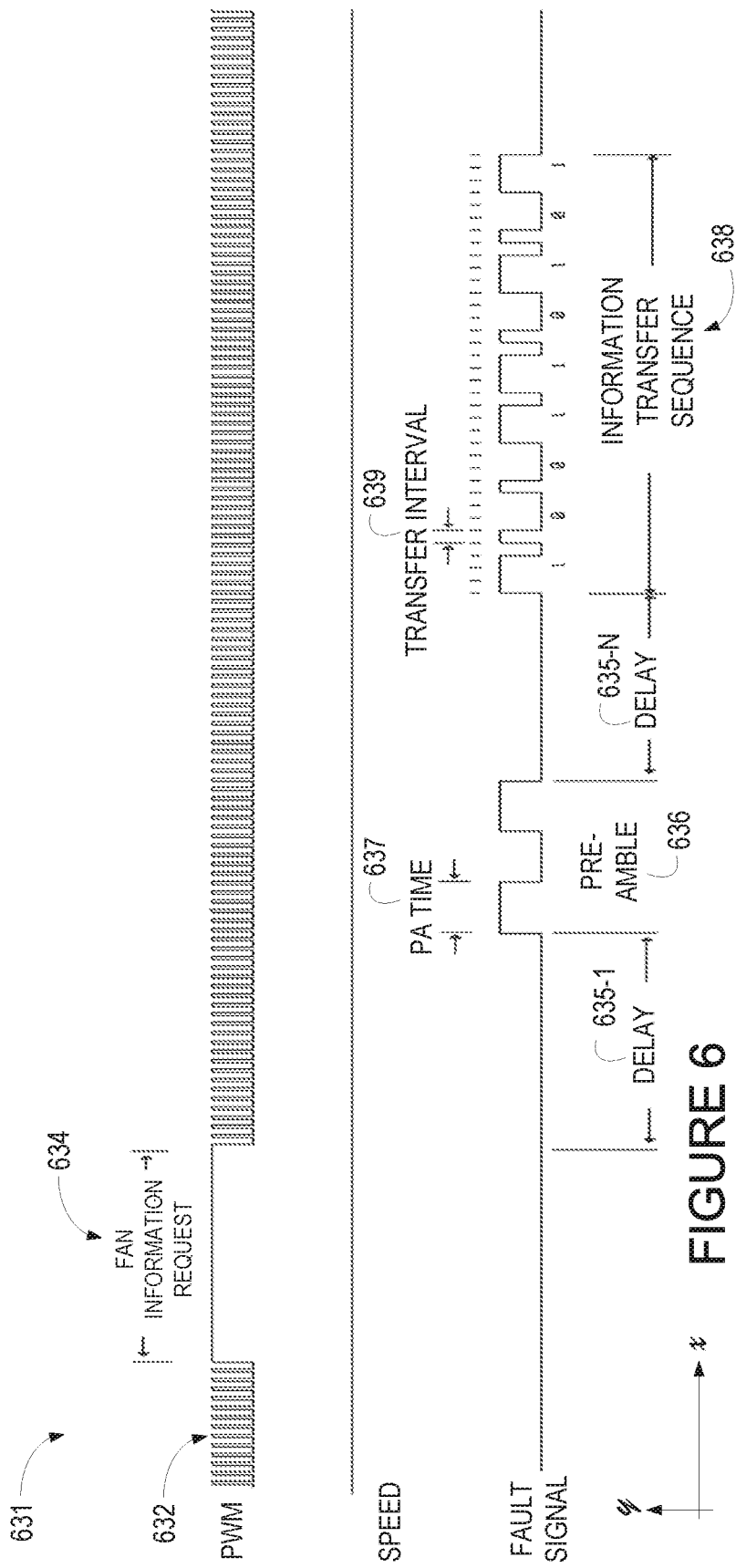
FIG. 6 illustrates an example timing diagram including an initiation signal and information transfer sequence consistent with the disclosure.

FIG. 6 illustrates an example timing diagram 631 including a fan information request signal 634 and information transfer sequence 638 consistent with the disclosure. As shown in FIG. 6, a PWM signal that has a first duty cycle 632 can be asserted to a PWM pin of a fan (e.g., the first pin 103 of the fan 102 illustrated in FIG. 1, herein). The PWM signal that has the first duty cycle 632 can cause the fan to operate at a particular speed (e.g., at a particular RPM). The first duty cycle 632 may fall within a first PWM range (e.g., the first PWM range 422 illustrated in FIG. 4, herein). In response to receipt of the PWM signal corresponding to the first duty cycle 632, the fan may operate in a normal mode of operation.

At some point in time, a fan information request signal 634 can be asserted to the PWM pin of the fan. The fan information request signal 634 can be characterized as having a different duty cycle than the first duty cycle 632 associated therewith, as indicated by the difference in width along the x-axis of the fan information request signal 634 versus the first duty cycle 632. Responsive to assertion of the fan information request signal 634, a pre-amble signal 636 having a particular time (e.g., a PA time 637) associated therewith may be asserted on a fault signal pin of the fan. It is however noted that, in some examples, the pre-amble signal 636 is not asserted on the fault signal pin of the fan. The fault signal pin of the fan may correspond to the second pin 105 illustrated in FIG. 1, herein.

In some examples, a delay 635-1 may be provided subsequent to assertion of the fan information request signal 634 on the PWM pin and assertion of the pre-amble signal(s) 636 on the fault signal pin. The pre-amble 636 may be provided to signal to the fan or to a fan control component (e.g., the fan control component 204 illustrated in FIG. 2, herein) coupled to the fan that the fan is ready to begin transmission of information corresponding to the fan and/or that the fan control component is ready to begin receipt of information corresponding to the fan via the fault signal pin.

In some examples, the pre-amble signal 636 can include one or more signal pulses that last for a particular period of time. For example, in a non-limiting example, the pre-amble signal 636 can include two signal pulses that last for around 720 ms each.

Subsequent to assertion of the pre-amble signal 636, one or more delays 635-N may be provided to the fault signal pin. Subsequent to a final delay 635-N, an information transfer sequence 638 may be asserted on the fault signal pin. The delays 635-1, . . . , 635-N can last for different periods of time or for the same period of time. In one non-limiting example, the first delay 635-1 can last for around 500 ms, while the second delay 635-N can last for around 250 ms.

The information transfer sequence may have one or more transfer intervals, such as transfer interval 639 associated therewith. The transfer intervals 639 can include assertion of signals for different periods of time. For example, the transfer interval can be around 180 ms, however, examples are not limited to this particular example. In some examples, the information transfer sequence 638 allows the fan control component to receive information corresponding to the fan. As described above, the information can include information corresponding to a manufacturer, model, revision number, serial number, barcode, or other information that may serve to identify characteristics of the fan.

In some examples, the information corresponding to the fan can be formatted in time domain multiplexed bits. For example, as shown in FIG. 6, during the information transfer sequence 638, the signal asserted on the fault signal pin can alternate between a HIGH value (corresponding to a logical value of "1") and a LOW value (corresponding to a logical value of "0"). The fan control component can, in some examples, interpret these values to ascertain information corresponding to the fan.

In some examples, the information corresponding to the fan can be transferred in accordance with a particular specification or protocol, such as the SMBus 2.0 specification. For example, the information corresponding to the fan can, for example, be transferred in 64-byte packets in accordance with the CRC-8 specification. Such specifications can allow for error checking to be performed on the packet containing the information corresponding to the fan to ensure data integrity.

It is noted that, in the example of FIG. 6, the speed of the fan (e.g., the RPM at which the fan operates) remains constant throughout assertion of the PWM signal corresponding to the first duty cycle 632, assertion of the fan information request signal 634, the delays 635-1, . . . , 635-N, the pre-amble 636, and the information transfer sequence 638. This may allow the fan to continue to operate in the normal mode of operation so as to continue to provide fluid flow to the computing components and/or computing system in which the fan is deployed during the performance of the operations illustrated in FIG. 6.

Figure 7:
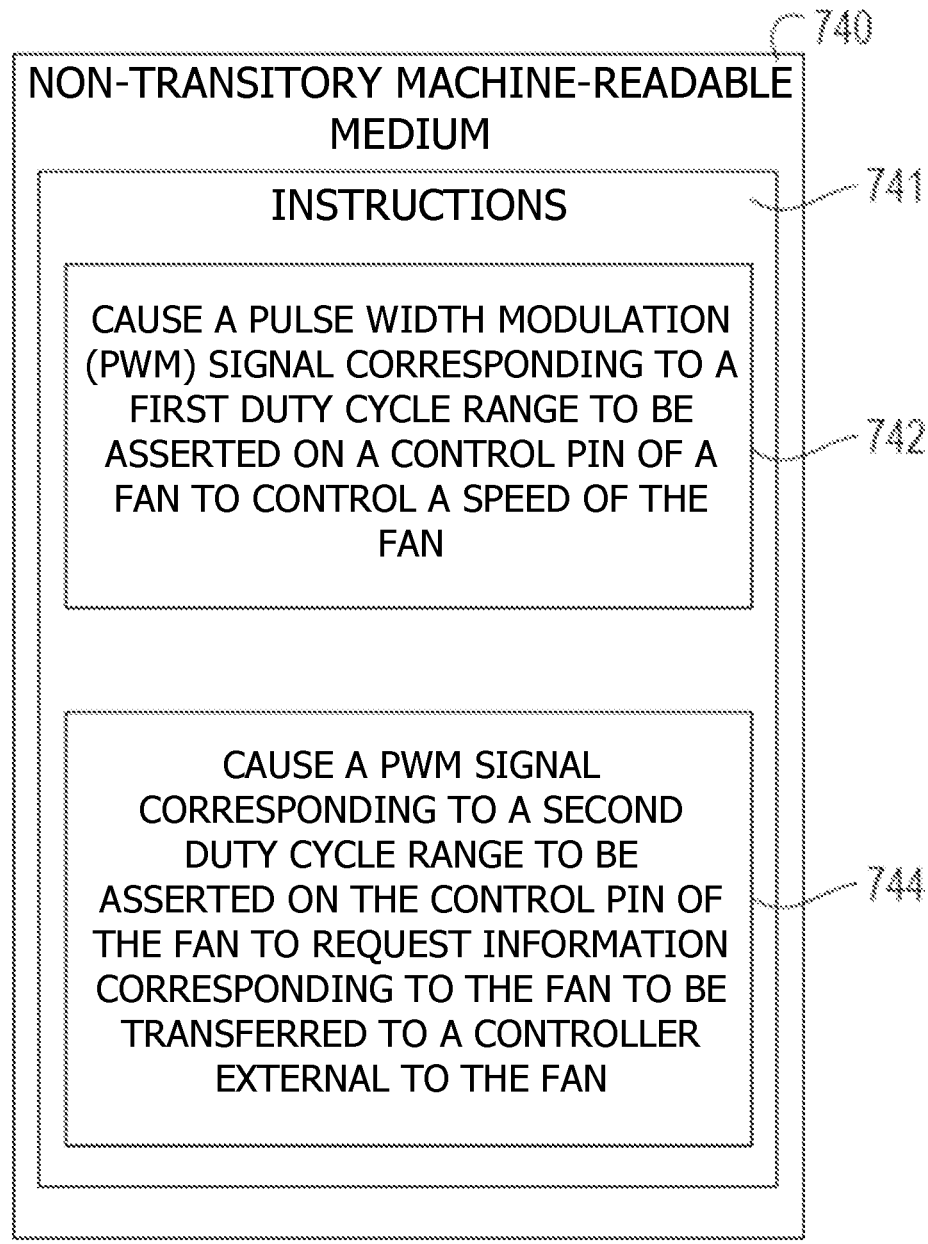
FIG. 7 illustrates an example machine-readable medium for a pulse width modulation fan consistent with the disclosure.

FIG. 7 illustrates an example machine-readable medium 740 for a pulse width modulation fan consistent with the disclosure. The example medium 740 may store instructions 741 executable by a processing resource such as a hardware computer processor to cause a computing system to perform certain tasks and/or functions, as described herein. The non-transitory machine readable medium 740 may be any type of volatile or non-volatile memory or storage, such as random-access memory (RAM), flash memory, read-only memory (ROM), storage volumes, a hard disk, or combinations thereof.

The example medium 740 may store instructions 742 executable by the processing resource to cause a pulse width modulated (PWM) signal having a duty cycle that falls within a first duty cycle range to be asserted on a control pin of a fan to control a speed of the fan. The PWM pin of the fan can correspond to the first pin 103 of the fan 102 illustrated in FIG. 1, herein.

The example medium 740 may store instructions 744 executable by the processing resource to cause a PWM signal having a duty cycle that falls within a second duty cycle range to be asserted on the control pin of the fan to request information corresponding to the fan to be transferred to a controller external to the fan. The signal may be a signal to request information from the fan, such as the fan information request signal 534 illustrated in FIG. 5, herein. In some examples, the information may be received by a fan control component (e.g., fan control component 204 illustrated in FIG. 2, herein) via a fault signal pin such as the second pin 105 of the fan 102 illustrated in FIG. 1, herein.

The second duty cycle range can correspond to the second PWM range 424 illustrated in FIG. 4, herein. In some examples, the processing resource causes a PWM signal having a particular duty cycle to be generated by communicating a digital value that represents the particular duty cycle to a signal generator. The digital value used by the processing resource may be referred to herein as a PWM value. The processing resource may use any mapping of PWM values to duty cycles. For example, if the processing resource uses 8 bits for the PWM values, then there are 256 possible PWM values that can represent 256 possible duty cycles. For example, if the values are mapped in assenting order, then 0 PWM would represent a duty cycle of 0% and 255 PWM would represent a duty cycle of 100%. In such an example, the second range may correspond to PWM values of 230 to 255 PWMs, since 230 PWM represents approximately 90% duty cycle and 255 PWM represents approximately 100% duty cycle. The PWM signal can further correspond to an initiation signal such as the fan information request signal 534 and 634 illustrated in FIGS. 5 and 6, respectively, herein.

In some examples, the example medium 740 may store instructions 741 executable by the processing resource to cause the computing system to process the information requested from the fan to determine static data, telemetry data, or combinations thereof, corresponding to the fan. For example, the example medium 740 may store instructions 741 executable by the processing resource to determine static data such as a fan vendor, a revision number, a manufacturing date code, a bar code, an error code, or combinations thereof corresponding to the fan and/or telemetry data such as data corresponding to environmental conditions of the fan.

The example medium 740 may store instructions 741 executable by the processing resource to cause the computing system to cause the information corresponding to the fan to be displayed via a graphical user interface (GUI). For example, the instructions 741 may be executable by the processing resource to generate a GUI and/or populate a GUI with a fan vendor, a revision number, a manufacturing date code, a bar code, a fan vendor, a revision number of the fan, a manufacturing date code of the fan, a bar code of the fan, a serial number of the fan, etc.

In some examples, the example medium 740 may store instructions 741 executable by the processing resource to cause the computing system to perform a diagnostic operation on the fan based, at least in part, on the received information corresponding to the fan. The diagnostic operation may include troubleshooting, tracking, and/or analyzing information corresponding to the fan to remediate performance issues the fan may be experiencing.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things. Multiple like elements may be referenced herein by their reference numeral without a specific identifier at the end.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. An apparatus, comprising:
a fan control component; and
a fan including a control pin communicatively coupled to the fan control component;
wherein the fan is to:
receive a pulse width modulated (PWM) signal from the fan control component via the control pin;
determine whether the PWM signal exceeds a threshold, wherein the PWM signal up to the threshold indicates, for the control pin, a first range of PWM signals that provides instructions for a valid fan speed, wherein the PWM signal exceeding the threshold indicates a second range of PWM signals that instructs the fan to provide information to the fan control component without altering a speed of the fan, and wherein the second range of PWM signals corresponds to a valid fan speed;
in response to the PWM signal at the control pin being in the second range, send information corresponding to the fan to the fan control component without altering the speed of the fan; and
in response to the PWM signal at the control pin being in the first range, control a speed of the fan based on a duty cycle of the PWM signal;
wherein a frequency of the PWM signal is not altered for communication between the fan control component and the fan.

2. The apparatus of claim 1, wherein the first threshold indicates that a predefined subset of fan speed control signals detectable by the fan is to be included in the second range.

3. The apparatus of claim 1, wherein the information corresponding to the fan includes static data, telemetry data, or combinations thereof.

4. The apparatus of claim 1, wherein the fan comprises control circuitry to lock a current fan speed for operating the fan at a same speed before and after receiving the PWM signal in the second range.

5. The apparatus of claim 1, wherein the fan further comprises a sensor to detect a change in an environment of the fan.

6. The apparatus of claim 1, wherein the fan is to send the information corresponding to the fan via a fault signal pin of the fan.

7. The apparatus of claim 1, wherein the fan is further to receive the PWM signal in the second range for a predetermined period of time spanning a plurality of PWM pulse periods.

8. An apparatus, comprising:
a fan control component, which includes a processing resource, to:
determine an operation for a fan based, at least in part, on a duty cycle of a pulse width modulated (PWM) signal indicating a valid fan speed of the fan, wherein the PWM signal up to a threshold indicates a first range of PWM signals that provides instructions for a valid fan speed, wherein the PWM signal exceeding the threshold indicates a second range of PWM signals that instructs the fan to provide information to the fan control component without altering a speed of the fan, and wherein the second range of PWM signals corresponds to a valid fan speed;
in response to the operation being a control operation, send the PWM signal in the first range to a control pin of the fan, thereby changing a current speed of the fan; and in response to the operation being a request operation, send the PWM signal in the second range to the control pin of the fan, thereby requesting information corresponding to the fan without altering the speed of the fan, wherein a frequency of the PWM signal is not altered for communication between the fan control component and the fan.

9. The apparatus of claim 8, wherein the information corresponding to the fan includes static data, telemetry data, or combinations thereof.

10. The apparatus of claim 8, wherein the first threshold indicates that a predefined subset of fan speed control signals detectable by the fan is to be included in the second range.

11. The apparatus of claim 8, wherein the fan control component is further to receive the information corresponding the fan via a fault signal pin of the fan.

12. The apparatus of claim 8, wherein the fan control component further is to perform a diagnostic operation on the fan based, at least in part, on information received responsive to the request operation.

13. The apparatus of claim 8, wherein the fan control component is further to send the PWM signal in the second range for a predetermined period of time spanning a plurality of PWM pulse periods.

14. The apparatus of claim 8, wherein the fan control component is further to tabulate and display the information corresponding to the fan via an interface.

15. A non-transitory machine-readable medium storing instructions executable by a processing resource to cause a computing system to:
determine a threshold for a pulse width modulated (PWM) signal to a control pin of a fan, wherein the PWM signal up to the threshold indicates, for the control pin, a first range of PWM signals that provides instructions for a valid fan speed, wherein the PWM signal exceeding the threshold indicates a second range of PWM signals that instructs the fan to provide information to a fan control component without altering a speed of the fan, and wherein the second range of PWM signals corresponds to a valid fan speed;
cause a first pulse width modulated (PWM) signal in the first range for a valid fan speed to be asserted on the control pin of a fan to control a speed of the fan; and
cause a second PWM signal in the second range to be asserted on the control pin of the fan to request information corresponding to the fan to be transferred to a controller external to the fan without altering the speed of the fan, wherein a frequency of the PWM signal is not altered for communication between the fan control component and the fan.

16. The non-transitory machine-readable medium of claim 15, wherein the instructions are further executable to cause the computing system to cause the first threshold to reflect that a predefined subset of fan speed control signals detectable by the fan is to be included in the second range.

17. The non-transitory machine-readable medium of claim 15, wherein the instructions are further executable to cause the computing system to process the information corresponding to the fan to determine static data, telemetry data, or combinations thereof, corresponding to the fan.

18. The non-transitory machine-readable medium of claim 15, wherein the instructions are further executable to cause the computing system to cause the information corresponding to the fan to be displayed via a graphical user interface.

19. The non-transitory machine-readable medium of claim 15, wherein the instructions are further executable to cause the computing system to perform a diagnostic operation on the fan based, at least in part, on information received responsive to the request for information corresponding to the fan.

20. The non-transitory machine-readable medium of claim 15, wherein the instructions are further executable to cause the computing system to cause the second PWM signal to be asserted for a predetermined period of time spanning a plurality of PWM pulse periods.

* * * * *